April 5, 1938. LE ROY SHULMAN ET AL 2,112,928
INSEAM MEASURING DEVICE
Filed Oct. 23, 1935   2 Sheets-Sheet 1
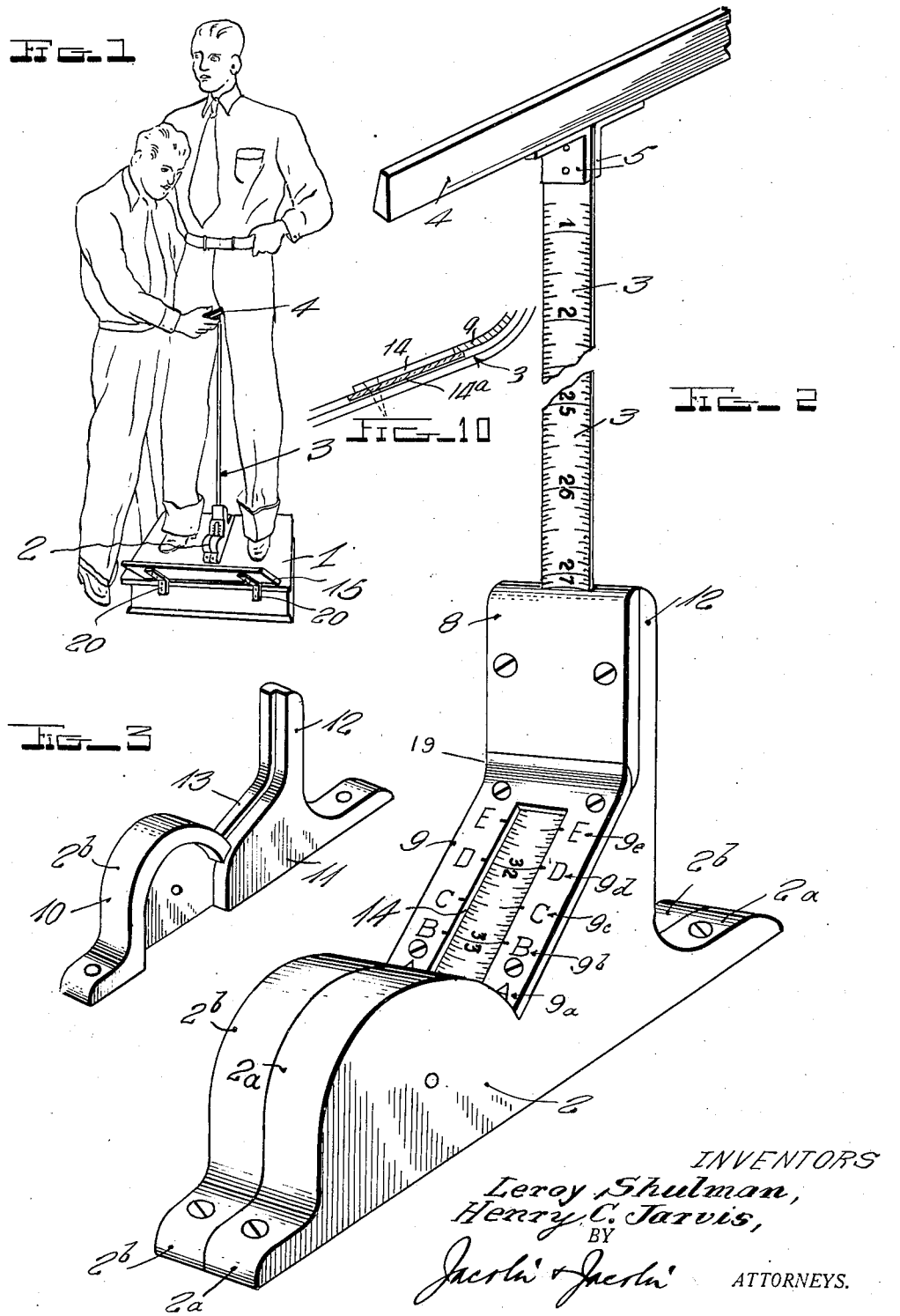
INVENTORS
Leroy Shulman,
Henry C. Jarvis,
BY
Jacklin & Jacklin   ATTORNEYS.

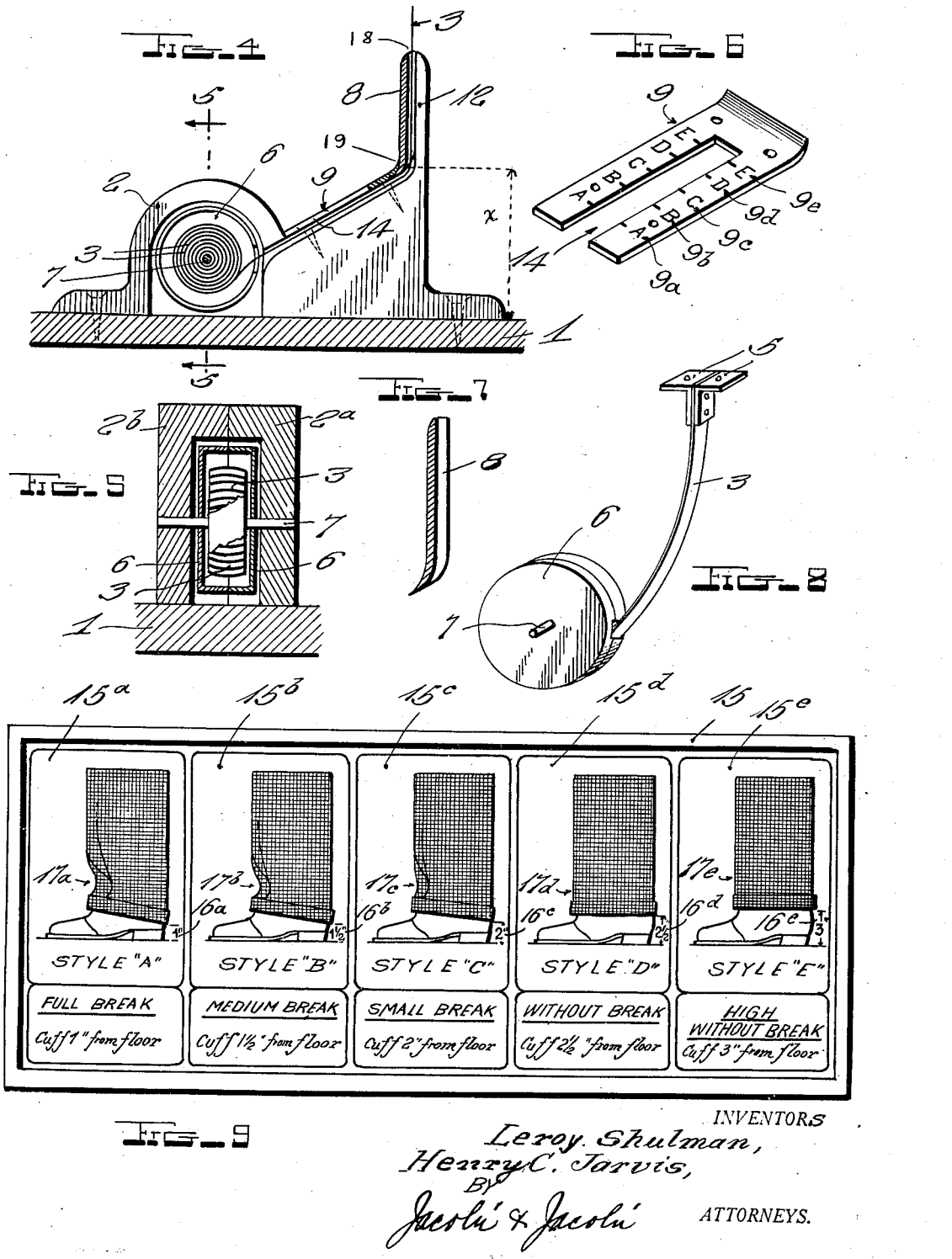

Patented Apr. 5, 1938

2,112,928

UNITED STATES PATENT OFFICE 2,112,928

INSEAM MEASURING DEVICE

Le Roy Shulman and Henry C. Jarvis, Norfolk, Va., assignors to Shulmansizer, Inc., Norfolk, Va.

Application October 23, 1935, Serial No. 46,436

15 Claims. (Cl. 33—8)

Our invention relates to a measuring instrument to be employed by tailors, and is particularly suitable for making the inseam measurement of trouser legs, although it may also be employed for other purposes.

In the making of the inseam measurement, the tailor ordinarily holds the end of the tape securely in position in the crotch, and guides the tape along the trouser leg down to the shoe, and reads off the distance to a point near the ankle where he believes the customer wishes the bottom of the trouser leg to fall, according to answers which the customer makes to the tailor's inquiries as to whether the customer wishes a long or short leg, and whether he wants a sharp or small break or no break in the bottom of the trouser leg. This requires the tailor to make a number of mental calculations in determining the point on the shoe to which he reads off the distance. The customer must stand straight, and has no opportunity to see the measurement being made by the tailor, or to verify the reading which the tailor calls off. Also, the customer has no facilities available to help him visualize what constitutes a sharp break and a small break, and how different lengths of leg measurement are related to the sharpness of break. This arrangement is satisfactory to neither the customer nor the tailor. Our invention also avoids the necessity of the tailor kneeling in making the measurement.

An object of our invention is to provide an inseam measuring device which avoids these disadvantages, and in which the tailor and customer can without bending read the proper inseam measurement corresponding to a desired style of bottom drape, without any mental calculations by the tailor being necessary.

Another object of our invention is to provide a device wherein a casing containing a measuring tape is fixedly mounted on a platform on which the customer stands.

A still further object of our invention is to provide a device in which the customer can observe pictorial representations of different styles of bottom drapes corresponding to different measuring register marks, while the measurement is being made.

Still another object of our invention is to provide a vertical terminal guide member for guiding into a vertical position the freely projecting portion of the measuring tape.

Another object is to provide a device which is easy to manufacture and assemble, low in cost and one which will be very efficient in application to use.

With these and numerous other objects in view, our invention consists in the novel features of construction, combination and arrangement of parts as will be hereinafter referred to and more particularly pointed out in the specification and claims.

We provide a flexible crotch bar which the tailor holds in position, and a coilable ruled metal tape, which is mounted on a platform on which the customer stands, and on which tape the measurement is read off against a register mark. We provide a plurality of such register marks corresponding to different degrees of break of the trouser leg and different trouser leg lengths for a given person. In order that the tape may be moved in accordance with the vertical movement of the crotch bar, the latter is suitably connected with the free end of the tape and we provide an obliquely positioned mounting for the tape and for the scale carrying the register marks, at the point where the measurement is read off, so that the measurement can be read off easily by the tailor or by the customer without either one having to bend. We also provide a display chart on which different styles of trouser bottoms, with different degrees of break, and different measured distances from the bottom of the trouser leg to the floor, are displayed, observable by the customer at the same time that he can see the reading of the tape. The display chart may also show different styles of finishing trouser bottoms, such as cuff bottoms and straight bottoms. The different styles displayed are correlated by reference letters with the different scale marks against which the tape reading is taken, so that the length can be easily determined which corresponds to the style which the customer desires.

Our invention will be better understood by reference to the following specification and the accompanying drawings wherein corresponding reference characters represent corresponding parts in all the figures, and wherein:

Figure 1 is a perspective view of our assembled measuring apparatus, showing the manner of its employment;

Figure 2 is a perspective view on an enlarged scale of our measuring device, showing more particularly the tape housing and the scale and associated parts;

Figure 3 is a perspective view of one half of the split tape housing;

Figure 4 is a central vertical longitudinal sectional view showing more particularly the housing of the tape and the guiding channel therefor;

Figure 5 is a transverse sectional view on the line 5—5 of Figure 4;

Figure 6 is a perspective view of the scale plate under which the tape is guided and on which the measurement is read;

Figure 7 is a detailed sectional view of one of the vertical channelled plates guiding the tape;

Figure 8 is a detailed perspective view of the tape casing and the lugs for attaching the tape to the crotch bar; and Figure 9 is a schematic view of the chart mounted on the customer's platform, showing the pictorial representations of the styles of trouser bottoms and styles thereof, to be displayed to the customer while on the platform.

Figure 10 shows in section a detail of a form of our invention with the scale plate and its light-transparent portion.

Referring to the figures in detail, in Figure 1, 1 is a platform or base member whereon a person may stand who is to be measured. A suitable size for this platform is about 18 by 18 inches square and 7 inches high. Centrally mounted on this platform is a tape housing 2 having a terminal cylindrical or drum portion, containing and supporting a coiled graduated tape 3. This tape is preferably of thin flexible strip metal, and is treated to be self-coiling. As previously explained, the tape is moved in accordance with the vertical movement of a suitable means for contacting the crotch, so that the position of such means determines the distance of movement of the tape. Suitably connected to one end of tape 3 to move the same is a flexible crotch bar 4, which is adapted to be fitted by the tailor flexibly in the crotch in making the inseam measurement.

The crotch bar is advantageously attached to the tape by any suitable means such as lugs 5. A cylindrical casing 6 is mounted in the tape housing 2 and has a rotatable pinion 7 on which the tape is coiled. The usual spring winding means with ratchet and spring is provided for actuating the pinion and coiling up the tape, which is well known in the art, and therefore is not shown in detail. The casing 6 and the housing 2 are apertured for the passage of tape 3 therethrough.

Mounted adjacent the tape aperture in housing 2 is an oblique channel member 13 provided with a channel of suitable size for the passage of tape 3 therethrough. As shown in the figures, the lower end of this oblique channel member is preferably adjacent the tape aperture in housing 2. This channel member 13 is mounted with its channelled surface making a substantial angle such as thirty or forty-five degrees with the horizontal; and the portion of the tape in this oblique channel member is used for reading the tape; this has the advantage of making the graduations on the tape much more readily readable by the person being measured or by the tailor, as compared with the difficulties of making such readings on either a horizontal or a vertical piece of the tape.

Adjacent the end of oblique channel member 13 remote from the housing 2 is a substantially vertical channel formed between two vertical guide members 8 and 12. The channels in member 13 and between members 8 and 12 are positioned for the continuous passage therethrough of tape 3 from the aperture in housing 2, to an upwardly opening aperture 18 constituting the terminus of the channel between guide members 8 and 12. The tape is thus guided through the oblique channel member 13 beneath a scale plate 9 and then vertically, so that it follows the vertical movement of the crotch bar 4. By this arrangement, the members 8 and 12 constitute a vertical standard or guide, which directs the tape in a vertical path.

Advantageously, the housing 2, oblique channel member 13, and vertical guide member 12, may be cast in one casting. Also as shown in the figures, a still more advantageous construction is to cast such unitary casting in two longitudinal halves, to facilitate assembly. In Figure 2, these two halves are shown as 2a and 2b. A detail of the structure of the half 2b is shown in Figure 3. This half 2b comprises the cylindrical housing portion 10, and the terminal portion 11 having the vertical channel portion 12 and the oblique channel portion 13.

A scale plate 9 is attached to the oblique channel portion 13. This scale plate is therefore also obliquely mounted at substantially the same angle to the horizontal as the oblique portion 13. The scale plate 9 is provided with a central slot or transparent portion 14, over the portion of tape 3 thereunder, through which the graduations on tape 3 can be read. Scale plate 9 is provided with one or more register marks, 9a, 9b, 9c, 9d, 9e, against which the readings of the graduations of the tape are made. For the purposes which we have in view, it is desirable to provide a plurality of such registration marks on the scale plate, which correspond to different styles of trouser bottoms, as hereafter described.

The transparent portion of scale plate 9 may consist of a suitable solid transparent substance such as glass, or a flat piece of glass may be held against the scale plate 9 covering completely the slot 14. Such an arrangement is shown in Figure 10, where 14a is a piece of glass held against scale plate 9 by the structure shown in Figure 4.

The vertical guide member 8 is attached to the vertical guide member 12 and is channelled to form the tape channel therewith. Vertical guide member 8 is fitted snugly against the upper end of oblique member 13 and scale plate 9. The tape 3 passes vertically downwards between guide members 8 and 12 to a point 19 where it passes into the oblique channel in oblique member 13. As shown in Figure 2, the several register marks 9a, 9b, 9c, 9d, 9e, are equally spaced, since such spacing is suitable for the styles of trouser bottoms here considered, but unequal spacings of the register marks may also be used if they are found desirable. When a plurality of register marks are used, they should be respectively identified by suitable reference characters to be noted by the observer; these are here shown as A, B, C, D, E, and correspond to different styles of wearing trouser bottoms.

Mounted on one end of platform 1, by brackets 20, preferably in an oblique position, is a style display chart 15 which is readily visible to the person standing on the platform while being measured. This chart 15 is shown in detail in Figure 9, and includes a plurality of pictorial representations of the different "breaks" of the draping of the trouser bottoms as formed when the length of the trouser leg is cut to be different distances above the floor when hanging freely as indicated by the register marks. In other words, the chart 15 pictorially represents to the person being measured the effect or appearance of the various trouser lengths indicated by the series of register marks on the scale plate, and there is thus a definite relationship between the scale plate, the fixed position or mounting of the graduated scale and the chart which may be observed during the measuring operation. In Figure 9, Style A, the full break 17a corresponds to a distance of one inch between the floor and the bottom of the freely hanging trousers. The medium break 17b, Style B, corresponds to a distance of 1½ inches between the floor and the trouser bottom. The small break 17c, Style C, corresponds to a distance of 2 inches between the floor and the trouser bottom. At 17d, Style D, is shown the trousers without break, corresponding to the distance of 2½ inches between the platform and the trouser bottom. Style E shows at 17e the trousers without break, but with the bottom hanging high, with a distance of 3 inches between the platform and the bottom of the trousers. The distances of 1 inch, 1½ inches, 2 inches, 2½ inches, 3 inches, are shown on the charts of Styles A, B, C, D, E, respectively at 16a, 16b, 16c, 16d, 16e. The scale marks A, B, C, D, E, on register plate 9, are also spaced one half an inch apart, the same as the spacing between the respective distances 1, 1½, 2, 2½, 3, inches of style charts A, B, C, D, E. Whether a uniform or non-uniform spacing is maintained between adjacent style distances, the spacing between two adjacent register marks as A and B on scale plate 9, should correspond to the difference between the corresponding heights from platform 16a and 16b on corresponding adjacent style charts A, B. Therefore register marks A, B, C, D, E, on scale plate 9 are respectively the same distances from a fixed zero reference point in the plane of scale plate 9 as the trouser bottoms in Styles A, B, C, D, E, are respectively above the platform on which the foot rests, that is, respectively the distances 16a, 16b, 16c, 16d, 16e.

In Figure 9, there are shown various styles of trouser bottom drapings, all for cuff bottoms. The chart may also show pictorial representations of the drapings of straight bottoms corresponding to different heights of the bottom from the platform when hanging freely, since the customer often desires a different kind of break for a straight bottom than he does for a cuff bottom. If the cuff styles are one-half an inch apart, as in Figure 9, it will ordinarily not be necessary to add additional register marks on scale plate 9 to take care of straight bottoms. It will suffice to place a panel of straight bottoms above the panel shown in Figure 9 of cuff bottoms, and to designate a desired style of straight bottom break by the same letter that designates one of the cuff bottom styles. The style charts for the straight bottoms will be assigned the proper letter A, B, C, D, E, corresponding to the respective heights from the platform.

The distance along scale plate 9 from the knee point 19 where the tape bends, to a given register mark such as D corresponding to a height of 2½ inches from the platform or floor, depends on the height of knee point 19 from the platform or floor, and will be 2½ inches less than the height of knee point 19 from the platform or floor.

If the tape is to be held straight up vertically as shown in Figure 1, it will also be necessary to adjust the position of the scale marks as D so that the measurement will correspond to the distance along the inseam of the trouser leg itself, which adjustment can be made once for all, and is familiar in the trade.

If the metal tape 3 possesses sufficient rigidity, the vertical guides 8 and 12 will hold it upright while a considerable portion of the tape is projecting above the upper end of guides 8 and 12, if restrained against the back pull of the coiling spring.

In making an actual measurement, the tailor will hold the flexible crotch bar 4 snugly in the crotch. The customer will select on the chart 15 the style of drape, A, B, C, D, or E, which he desires, and the tailor, can then, without bending over, read directly against register mark A, B, C, D, or E, on scale plate 9, the inseam measurement to which the trouser leg should be cut to give the desired effect. The customer can without bending or departing from the upright position which he must maintain while a measurement is being made, verify the length which the tailor reads off from the tape, while the customer can at the same time observe the style chart 15. The employment of the crotch bar 4 avoids embarrassment to the customer, and the flexible structure of the crotch bar facilitates fitting it in desired manner in the crotch, to find the proper measuring point.

Ordinarily when a tailor takes the inseam measurement for a pair of trousers, he is not only called upon to calculate the distance from the ground to the bottom of the trousers, but usually he is required to pin the trousers at the bottom to the desired length to be worn and to provide for the kind of break in the trousers that the customer desires. This requires the tailor to stoop down in order that his eyes may be substantially on a level with the bottom of the customer's trousers and make the calculation as above indicated before attempting to pin the trousers. This is awkward to say the least and often causes the tailor to make a miscalculation. On the other hand, with the use of our invention, as herein disclosed and described, the customer merely indicates the style of bottom that he desires on his trousers, as shown by the chart readily observable from the platform, and when the measurement is taken by the tailor, there is but one movement which involves the pulling of the metal tape out of the slot and contacting the crotch bar with the crotch of the customer. There is instantly indicated at the base of the measuring device the exact measurement desired according to the selection of the customer from the style chart and there is no further operation necessary.

Our device is simple and convenient in employment, and greatly facilitates the making of the inseam measurement.

While we have described our device particularly with reference to the making of the inseam measurement, it will be obvious that it is equally adapted to the making of many measurements, and that slight modifications therein may be made to adapt it to particular measurements, which modifications will be obvious to those skilled in the art.

Having thus described the invention what is claimed is:

1. In a measuring instrument, a graduated measuring tape, a housing having a flat base portion, a spindle in said housing, said tape having one end attached to said spindle and being wound therearound in coiled relation, said housing being apertured for the passage of said tape therethrough, a scale plate provided with a register mark and mounted on said housing adjacent said aperture in oblique relation to said flat base portion thereof, channel means adjacent said scale plate for guiding said tape therealong opposite said register mark thereon, and terminal guide means mounted adjacent said scale plate at the end thereof remote from said spindle for maintaining said tape in a determined path during the longitudinal movement of said tape.

2. In a measuring instrument, a graduated measuring tape, a casing, a spindle in said casing, said tape having one end attached to said spindle and being wound therearound in coiled relation, a two-piece housing enclosing said casing, and having a flat base portion, said casing and said housing being apertured for the passage of said tape therethrough, a scale plate provided with a register mark mounted on said housing adjacent said aperture in oblique relation to said flat base portion thereof, a pair of channel members adjacent said scale plate for guiding said tape therealong opposite said register mark thereon, each of said channel members being formed integrally with each of the two pieces of said housing respectively, and terminal guide means mounted adjacent said scale plate at the end thereof remote from said housing for maintaining said tape in a determined path during the longitudinal movement of said tape.

3. In a measuring instrument, a base member, a graduated flexible metal tape, a tape housing mounted on said base member and comprising a rotatable spindle whereon said tape is coiled, the periphery of said housing being apertured for the passage of said tape therethrough, an obliquely mounted channel member having one end adjacent the aperture in said tape housing, a substantially vertical guide channel member mounted on the other end of said obliquely mounted channel member and extending upwardly therefrom, said channel members being provided with a central channel adapted for the continuous passage of said tape therethrough, an obliquely positioned scale plate mounted on said obliquely mounted channel member and having a light-transparent portion in register with the portion of said tape under said plate, and also having a register mark adjacent said tape, whereby the height of the end of said tape above said base member may be readily read on said tape opposite said register mark.

4. In an inseam measurer, a crotch bar, a graduated tape, a housing, a rotatable spindle in said housing carrying one end of said tape, said housing being apertured for the passage of said tape therethrough, the other end of said tape being attached to said crotch bar, a scale plate provided with a register mark mounted adjacent said housing and said aperture therein and guide means attached to said scale plate and adapted to guide said tape along said plate in register with said mark between said housing and said bar and to guide said tape exposed to view from without said housing.

5. In an inseam measurer, a housing having a flat base portion and comprising a pair of similar integral housing members joined together, each of said housing members having a terminal drum portion open on one side and an opposite terminal vertical elevated portion, said members being assembled with the open sides of said drum portions facing each other, a rotatable spindle mounted in the chamber formed by said assembled drum portions, a coiled graduated tape carried on said spindle, each of said housing members also having a substantially linear oblique shoulder portion intermediate said terminal portions and obliquely positioned with reference to said base portion, the upper surface of each of said shoulder portions being recessed to form together when assembled a channel adapted to slidably receive said tape, said drum portions being apertured for the passage of said tape to said channel, a scale plate mounted over said assembled shoulder portions and provided with a scale mark, said plate being slotted in register with said channel, said elevated terminal portion projecting above said shoulder portion, and a vertical guide plate attached to the portion of said elevated terminal portion projecting above said shoulder portion and being recessed to form with said projecting elevated terminal portion a channel to receive said tape which is continuous with the channel formed by said shoulder portions.

6. In an inseam measure, a base, an indicating device carried by the base and having a plurality of markings representing a plurality of predetermined selective trouser bottom positions indicated thereon, a lineal measuring element including a flexible measuring tape associated with said indicating device and movable upwardly and past said markings in reading register therewith to determine the desired trouser length, and storing means for said tape carried by said base.

7. In an inseam measure, a base, an indicating device carried by the base and having a plurality of markings representing a plurality of predetermined selective trouser bottom positions indicated thereon, a lineal measuring element including a flexible measuring tape associated with said indicating device and movable upwardly and past said markings in reading register therewith to determine the desired trouser length, a transversely extending crotch bar carried on an outer end of said tape, and storing means for said tape carried by said base.

8. In an inseam measure, a base, a lineal measuring element including a flexible measuring tape, storing means for said tape carried by said base, and a scale plate carried by said base in oblique relation thereto and in reading register with the path of the tape and provided with markings indicating trouser lengths, said measuring tape being movable past said scale plate to permit the graduations on the tape to register with the scale markings for indicating the correct measurements.

9. In an inseam measure, a base, an indicating device carried by the base and having a plurality of markings representing a plurality of predetermined selective trouser bottom positions indicated thereon, a lineal measuring element including a flexible measuring tape associated with said indicating device and movable upwardly and past said markings in reading register therewith to determine the desired trousers length, storing means for said tape carried by said base, said base and indicating device being provided with an abutment, and stop means comprising a shoulder carried by said tape and engageable with said abutment for limiting the return movement of said tape into said storing means.

10. In an inseam measuring device, a platform adapted to support the person in standing position, a housing carried by said platform, a coiled graduated measuring tape in said housing having a mounting fixed in relation to the platform, means for guiding said tape comprising an inclined channel at an angle to the vertical and a vertical channel connected therewith, the tape being disposed for movement through the inclined and vertical channels, a rigid vertical body associated with said housing and forming said vertical channel, said channel at an angle to the vertical being apertured whereby the movement of the tape may be observed, and a scale plate associated with said apertured channel and having a series of register marks thereon.

11. In an inseam measuring device, a platform adapted to support the person in standing position, a housing carried by said platform, a coiled graduated measuring tape in said housing having a mounting fixed in relation to said platform, a vertically movable crotch bar, means connecting the crotch bar to the free end of said tape, a channel for guiding said tape at an angle to the vertical and then vertically, when the crotch bar is moved vertically, a portion of said channel being apertured, and a scale plate associated with the apertured portion of said channel and having thereon a register mark.

12. In an inseam measuring device, a platform adapted to support a person in standing position, a housing positioned on said platform, said housing comprising a chamber, a channel extending obliquely upwardly from said chamber, a vertical channel communicating with said oblique channel, a coiled graduated tape in said chamber having its free end disposed to extend through said oblique channel into said vertical channel, a vertically movable crotch bar freely engageable for manual movement, means connecting the crotch bar to the free end of said tape, said oblique channel being apertured, and a scale plate associated with the apertured portion of said channel and having a register mark thereon.

13. In a measuring instrument, a base member, a graduated flexible metal tape, a tape housing mounted on said base member and comprising a casing for storing said tape, the periphery of said housing being apertured for the passage of said tape therethrough, an obliquely mounted channel member having one end adjacent the aperture in said tape housing, a substantially vertical guide channel member mounted on the other end of said obliquely mounted channel member and extending upwardly therefrom, said channel members being provided with a central channel adapted for the continuous passage of said tape therethrough, an obliquely positioned scale plate mounted on said obliquely mounted channel member and having a light-transparent portion in register with the portion of said tape under said plate, and also having a register mark adjacent said tape, whereby the height of the end of said tape above said base member may be readily read on said tape opposite said register mark.

14. In an inseam trouser measuring device, a platform adapted to support the person in standing position, a coiled graduated measuring tape, means carried on said platform for rotatably mounting said tape with one end of said tape in fixed position relative to said platform, a vertically movable crotch bar, means for connecting the free end of said tape to said crotch bar, a channel mounted in fixed vertical relation to said platform for movably guiding the portion of said tape extending between the coiled portion of said tape and said crotch bar, and a scale plate carried by said channel and having a plurality of spaced register marks and being positioned in reading register with said graduated tape as said tape is movably guided along said channel, said graduations on said measuring element and said register marks being so positioned that a reading made on said tape against a given register mark is the distance between the top of said crotch bar and a trouser bottom position which is the same distance above said platform as said register mark on said scale plate is distant from a fixed zero reference point in the plane of said scale plate.

15. In an inseam trouser measure, a displaceable graduated scale member, means comprising a guide channel member for vertically supporting said scale member, a crotch bar displaceable along with said scale member, and selective register mark means in reading register with the graduations on said scale member adapted to provide a plurality of spaced positions of register mark against which the graduations of said scale member when read will give readings which will respectively represent for the crotch bar in a given position the lengths of trouser legs which respectively correspond to different desired heights of trouser bottom positions above a reference point fixed in relation to said guide channel member.

LE ROY SHULMAN.
HENRY C. JARVIS.